United States Patent Office 3,278,450
Patented Oct. 11, 1966

3,278,450
ORTHOPHOSPHATE PHOSPHOR COMPOSITIONS
Richard C. Ropp, North Caldwell, N.J., assignor to Sylvania Electric Products Inc., a corporation of Delaware
No Drawing. Filed Nov. 1, 1963, Ser. No. 320,851
3 Claims. (Cl. 252—301.6)

This invention relates to phosphors which are suitable for use in fluorescent lamps. Particularly, this invention concerns tin activated calcium orthophosphate phosphors having certain cationic substitutions for the calcium atoms in the matrix.

Tin-activated calcium orthophosphate phosphors are known to the art and such phosphors have previously been employed to coat the inner glass surface of fluorescent lamp envelopes. I have found, however, that the zinc-substituted, calcium orthophosphate phosphors activated by tin, which are also known to the art, can be greatly improved by further substituting magnesium and strontium cations for the calcium cations. The emission color can be substantially the same as known phosphors, but the brightness is materially improved. Particular ratios of these cations give unexpected increases in emission intensity when excited by radiation having a wavelength of 2537 A.

Accordingly the primary object of my invention is improving the emission characteristics of tin activated, calcium orthophosphate phosphors.

A feature of my invention is substituting strontium and magnesium cations for calcium cations, in specific rations, to form fluorescent phosphors.

An advantage of my invention is that the emission intensity of the phosphor is superior to that which is attained from the known tin activated, zinc substituted, calcium orthophosphate phosphors.

The many other objects, features and advantages of the instant invention will become manifest to those versed in the art upon reading the following specification wherein preferred embodiments of my invention are described by way of illustrative examples.

The luminescent materials according to my invention are calcium orthophosphate phosphors activated by tin, containing zinc as a major matrix modifier together with strontium and magnesium as minor matrix modifiers, the number of atoms of the minor matrix modifiers not exceeding one half the number of zinc atoms. In my phosphor, the magnesium and strontium are each present in quantities of 0.005 to 0.075 gram atoms per 2 moles of orthophosphate and the zinc is present in quantities of 0.15 to 0.29 gram atoms per 2 moles of orthophosphate. The total number of cations (excluding the activator) are present in quantities of 2.65 to 2.95 gram atoms per 2 moles of orthophosphate. The activator, tin, is present in conventional quantities of 0.005 to 0.15 gram atoms per two moles of orthophosphate.

As will be seen from Table I following, the brightness of the various tin activated, calcium orthophosphate phosphors is effected by the cations present in the matrix together with their respective quantities. In the table, the phosphors have first been tested outside of lamps and listed under the percent plaque brightness columns; the columns being divided into blue, green and red light emission. When the phosphors were subsequently coated on lamp envelopes and tested, the brightnesses are recorded in the lumens column; this column is divided into lumen readings at 0 and 100 hours.

Each of the phosphors were tin activated and had an orthophosphate composition with the quantities of each of the cations, Ca, Zn, Sr and Mg being listed in the column under cations. The numbers listed under these columns are the number of atoms of the respective metal per two moles of orthophosphate.

Entry A, which is indicative of a prior art phosphor contained no strontium or magnesium and had an initial brightness of 2129 lumens which decreased to 1955 lumens in one hundred hours. The phosphor had a reddish-white emission color. In entry B, when strontium was added to the phosphor of entry A, the blue and green plaque brightness was increased but the red went down slightly. The lumen values were somewhat increased because of the increase in blue brightness. When, in entry C, the strontium was eliminated and magnesium substituted, the plaque brightness was about the same but the brightness was reduced to 2152 lumens and the 100 hour lumen value decreased to 1924 lumens. Only in entry D, which is a phosphor included within the scope of my invention where both the magnesium and strontium are present together with the zinc, was the total brightness raised materially. As is apparent, the plaque brightness is somewhat comparable to entry C, but the brightness is unexpectedly increased.

Entry E demonstrates the reduction in brightness when the zinc is eliminated and the strontium included in rather large quantities. Both the plaque and lamp brightness are reduced materially. When small quantities of zinc are added to this phosphor (entry F), but smaller than the quantities of strontium, the plaque brightness is not materially different from that which occurs when zinc alone is the matrix modifier. In the latter case however, the lamp brightness is quite adversely affected. Entry G represents the adverse results obtained when strontium is present as the major matrix modifier along with small amounts of magnesium.

Comparing the phosphor containing only strontium as a matrix modifier (entry E) with the phosphors containing zinc and strontium as a matrix modifier (entry B) it is apparent that not only is the plaque brightness reduced when zinc is not present but also the lamp brightness is lower.

When small quantities of zinc are incorporated in the matrix (entries H, I, and J) the lamp brightness is reduced from that which is attained in the preferred phosphor (entry D). Furthermore, except for entry I, which contains no strontium, the plaque brightnesses are reduced.

TABLE I

| Phosphor | Ca | Zn | Sr | Mg | Percent Plaque | | | Lumens | |
|---|---|---|---|---|---|---|---|---|---|
| | | | | | B | G | R | 0 hr. | 100 hr. |
| A | 2.65 | .20 | | | 100 | 100 | 100 | 2,129 | 1,955 |
| B | 2.55 | .22 | .08 | | 140 | 104 | 97 | 2,257 | 2,071 |
| C | 2.55 | .22 | | .08 | 127 | 100 | 97 | 2,152 | 1,924 |
| D | 2.55 | .22 | .04 | .04 | 146 | 114 | 104 | 2,304 | 2,120 |
| E | 2.55 | | | .22 | 100 | 100 | 100 | 1,620 | 1,540 |
| F | 2.55 | .08 | | .22 | 103 | 100 | 104 | 1,963 | 1,791 |
| G | 2.55 | | .22 | .08 | 93 | 91 | 98 | 2,009 | 1,868 |
| H | 2.55 | .04 | .22 | .04 | 97 | 96 | 100 | 2,011 | 1,871 |
| I | 2.55 | .08 | | .22 | 127 | 100 | 97 | 2,260 | 1,944 |
| J | 2.55 | .04 | .04 | .22 | 83 | 82 | 88 | 2,091 | 1,757 |

Now entry D, which is a phosphor within the preferred embodiment of my invention, is a quaternary alkaline-earth orthophosphate having substantially the same emission spectra as the known binary orthophosphate $(CaZn)_3(PO_4)_2$:Sn (entry A). The efficiency of the phosphor is substantially greater, however.

In preparing the improved phosphors to my invention, I prefer to use $CaHPO_4$, $ZnO$, $3MgCO_3 \cdot Mg(OH)_2 \cdot 3H_2O$ and $SrCO_3$, although other combinations of ammonium phosphates may be combined with calcium, zinc, magnesium and strontium salts which decompose upon heating to form the oxide to form the orthophosphate. The activator is preferably added as SnO, but is not limited to any specific compound other than those containing tin. The correct proportions of the various raw materials may be mixed by hammermilling, ball milling or other suitable means. After the mixture is prepared, it is fired at a temperature between 1500° F. and 2400° F., but not limited to that range, in air to form the orthophosphate matrix containing tin activator as $Sn^{+4}$. The prefered matrix is subsequently refired in a reducing atmosphere at a temperature between 1500° F. and 2400° F., but not limited to that range, in which the percentage of $H_2$ in the $N_2$-$H_2$ reducing gas mixture lies between 1–15%, as is well known in the art, to form the luminescent phase containing tin as $Sn^{+2}$.

As examples of preparing the phosphors of my invention, I cite the following:

Mix together thoroughly, 1097.6 gm. $CaHPO_4$, 214.0 gm. $CaCO_3$, 68.4 gm. ZnO, 23.7 gm. $SrCO_3$, 15.1 gm. $3MgCO_3 \cdot Mg(OH)_2 \cdot 3H_2O$ and 10.8 gm. SnO. Prefire in air for 4 hours at 2100° F. in an open 7″ silica crucible, cool and refire in a 95% $N_2$-5% $H_2$ gas mixture in a closed tube furnace, 2 hours at 2100° F., in a silica tray. A Zn modified phosphor $(Ca, Zn, Sr, Mg)_3(PO_4)_2$:Sn is obtained.

Another procedure is to mix together 1097.6 gm. $CaHPO_4$, 214.0 gm. $CaCO_3$, 68.4 gm. ZnO, 47.4 gm. $SrCO_3$, 15.1 gm. $3MgCO_3 \cdot Mg(OH)_2 \cdot 3H_2O$ and 10.8 gm. SnO. Process as before.

Alternately, the firing process can be performed by a single pass through a continuous tube furnace in which the initial temperature zone or zones contain a dynamic $N_2$ atmosphere to effect formation of the matrix and incorporation of the activator and the final zone or zones contain a 95% $N_2$-5% $H_2$ dynamic atmosphere to develop the luminescence by formation of the luminescent state, $Sn^{+2}$, of the activator.

Another example is to mix together 1065.0 gm. $CaHPO_4$, 220.2 gm. $CaCO_3$, 26.0 gm. ZnO, 23.7 gm. $SrCO_3$, 83.7 gm. $3MgCO_3 \cdot Mg(OH)_2 \cdot 3H_2O$ and 16.2 gm. SnO. Process according to the above examples. This forms a Mg modified phosphor $(Ca, Mg, Sr, Zn)_3(PO_4)_2$:Sn.

It is apparent that changes and modifications may be made within the spirit and scope of the instant invention, but it is my intention however, to be limited only by the scope of the appended claims.

As my invention I claim:

1. A calcium-zinc orthophosphate phosphor activated by tin, said phosphor containing at least one member selected from the group consisting of strontium and magnesium atoms in the matrix, the member being present in quantities of between about 0.005 to 0.075 gram atoms per two moles of orthophosphate, said zinc being present in quantities of between about 0.15 to 0.29 gram atoms per two moles of orthophosphate.

2. The phosphor according to claim 1 wherein the total number of cations are between about 2.65 to 2.95 gram atoms per two moles of orthophosphate.

3. The phosphor according to claim 2 wherein there are 0.005 to 0.15 gram atoms of tin per two moles of orthophosphate.

References Cited by the Examiner

UNITED STATES PATENTS

| | | |
|---|---|---|
| 2,786,034 | 3/1957 | Butler. |
| 2,901,647 | 8/1959 | Thomas. |

FOREIGN PATENTS

| | | |
|---|---|---|
| 863,618 | 3/1961 | Great Britain. |
| 990,629 | 4/1965 | Great Britain. |

TOBIAS E. LEVOW, *Primary Examiner.*

R. D. EDMONDS, *Assistant Examiner.*